June 24, 1930. D. T. HOLMES 1,766,517
BRAKE
Filed March 22, 1927 2 Sheets-Sheet 1
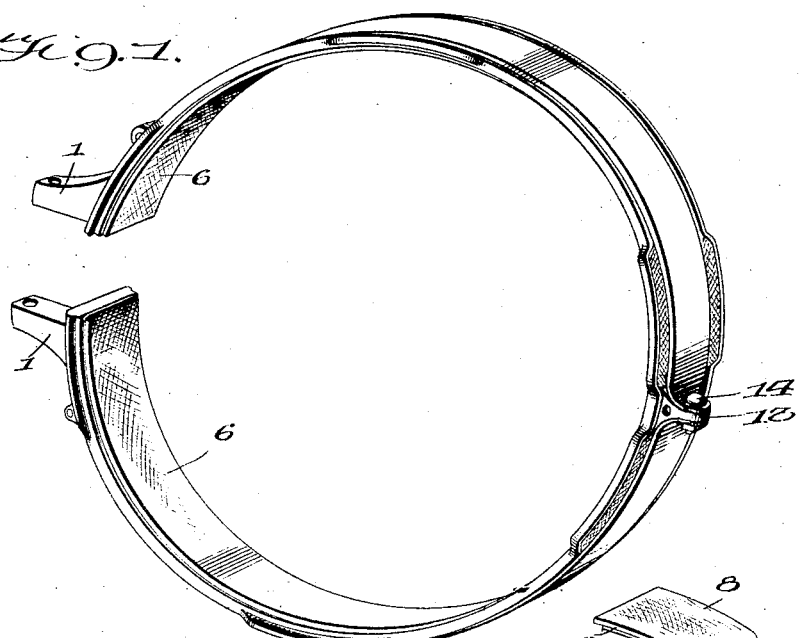
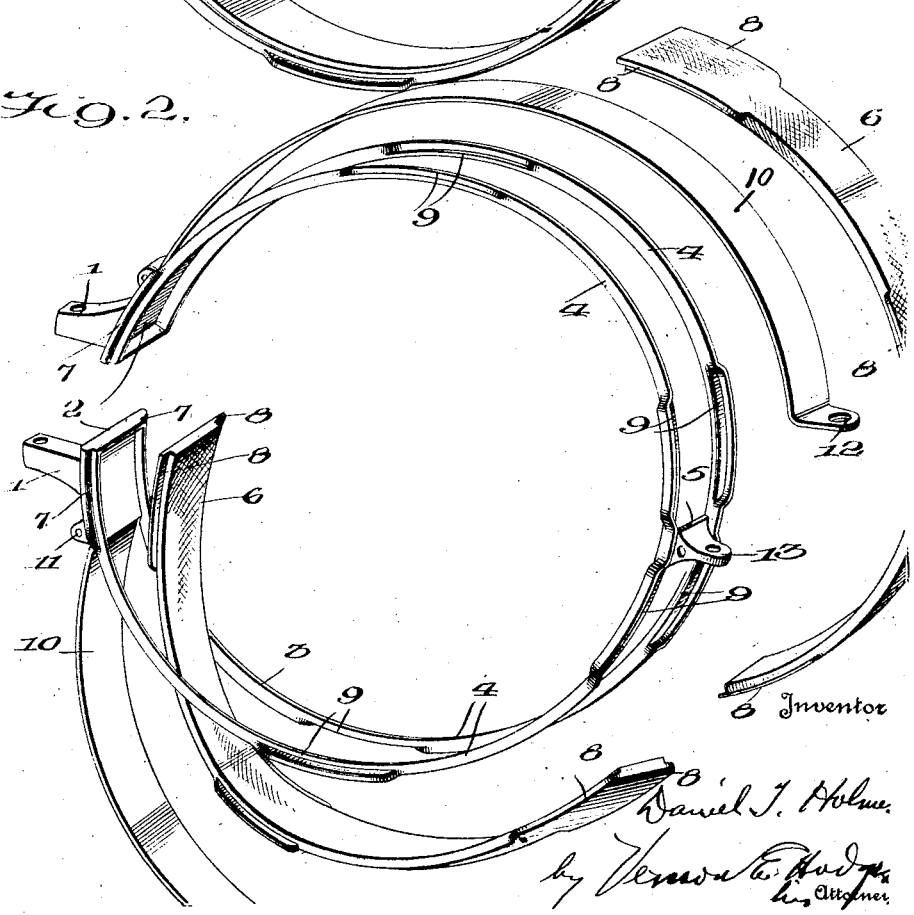

June 24, 1930. D. T. HOLMES 1,766,517
BRAKE
Filed March 22, 1927   2 Sheets-Sheet 2

Inventor
Daniel T. Holmes
By Vernon E. Hodges
His Attorney

Patented June 24, 1930

1,766,517

UNITED STATES PATENT OFFICE

DANIEL T. HOLMES, OF WEBB CITY, MISSOURI, ASSIGNOR OF ONE-FOURTH TO OLL ROGERS AND ONE-FOURTH TO ERNEST WILLIAMS, BOTH OF WEBB CITY, MISSOURI

BRAKE

Application filed March 22, 1927. Serial No. 177,445.

This invention relates to an improvement in brakes.

The object of the invention is to provide a brake in which the lining may be easily and quickly inserted without disconnecting the entire brake, thereby greatly simplifying and decreasing the cost of re-lining the brakes of a motor vehicle.

A further object of the invention is to prevent the lining from slipping forward or backward, or from dragging on the brake-drum when the brakes are applied.

With this invention the brake-lining is detachably connected with a frame which holds it in place without the use of the usual rivets. Flanges are formed directly on the lining, which fit in notches or grooves in the frame to hold it in place, thus allowing the lining to be moved longitudinally into its supported position, after which it is clamped by means of a cap, and thereby securely held against any movement relative to the frame, and also allowing it to be easily and quickly replaced or renewed when desired.

In the accompanying drawings:

Fig. 1 is a perspective view of a complete brake-band;

Fig. 2 is a disassembled view of the same;

Figure 3:
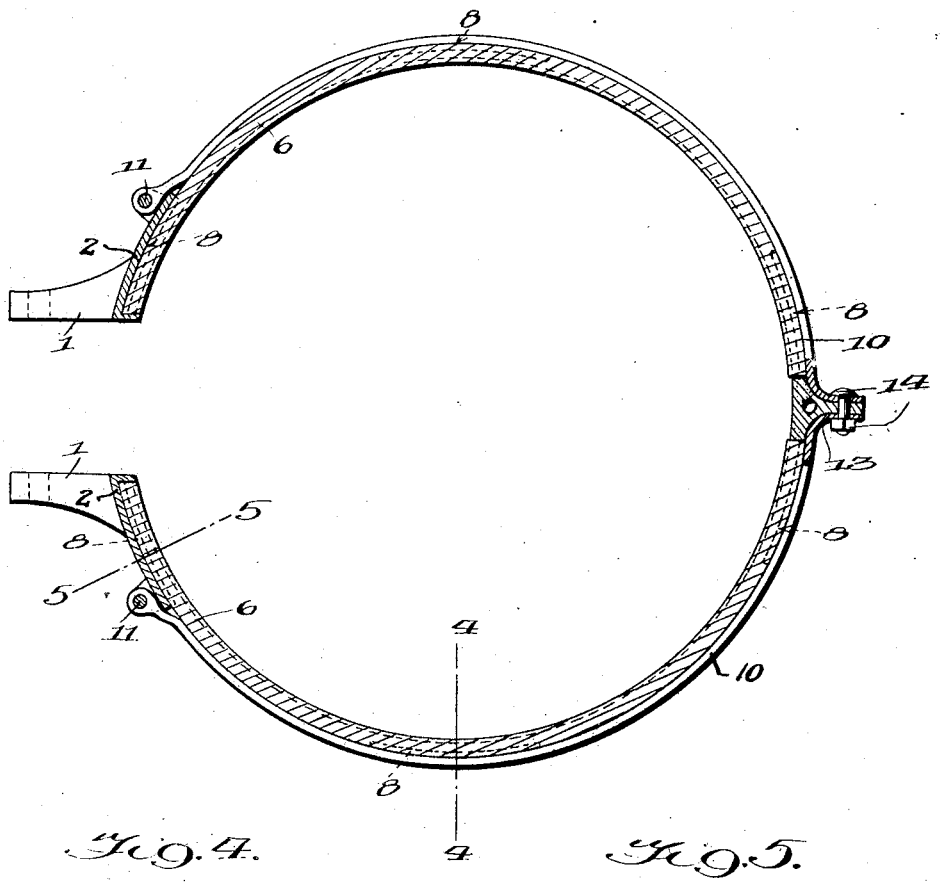
Fig. 3 is a longitudinal section through the brake-band.
Figure 4:
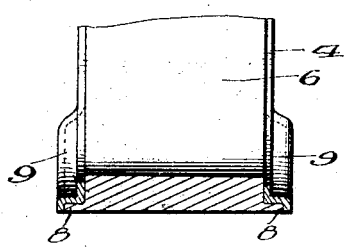
Fig. 4 is a transverse section on the line 4—4 of Fig. 3.
Figure 5:
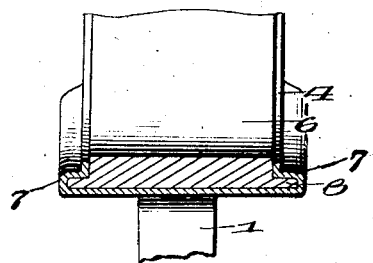
Fig. 5 is a transverse section on the line 5—5 of Fig. 3.

The numeral 1 indicates the usual lugs which are provided for adjustably clamping the brake-band in its proper position about the brake-drum. These lugs 1 are secured to transverse plates 2 formed on the ends of a frame 3. This frame is formed of side members 4 joined together on the opposite side thereof from the lugs 1 by a plate 5. The frame is made in the usual circular form to fit about a brake-drum, and is intended to support a brake-lining 6 in position to clamp the same upon the drum whenever desired to break the rotating action thereof. For this purpose the plates 2 are provided with grooves 7 in their opposite edges to receive flanges 8 formed on the opposite sides of each of the brake-linings 6. Similar notches 9 are formed midway of and at the opposite sides of the frame 3, as shown in Fig. 2 to receive similar flanges 8 formed at the edges of the middle and opposite ends of the brake-lining 6.

To apply the brake-lining to the frame, the flanges 8 are slid into the grooves 7 formed in the frame at the ends thereof, after which each of the linings is moved between the side members 4 as shown in Fig. 2, and the other flanges 8 seated in the notches 9, which hold the brake-lining in their proper positions in the frame and prevent any movement thereof relative to the frame.

Caps 10 are pivoted as at 11 to the plates 2, and have their opposite ends bent outwardly to form lugs 12, which fit on the opposite sides of a lug 13 carried by the plate 5, and are secured thereto by a bolt 14, as shown in Fig. 1. These caps 10 hold the lining securely in the frame, and prevent the flanges 8 from becoming displaced from the notches 9, thereby providing a fixed and secure holding of the brake linings in the frame without the use of rivets.

With this invention the brakes may be re-lined easily, and without the loss of a large amount of time ordinarily required, merely by removing the bolt 14 and releasing the caps 10 which permit of the lining 6 being displaced from between the side members 4 of the frame, sliding the flanges 8 out of the grooves 7, and then reinserting the new lining. The whole operation would require only a few minutes as compared with perhaps several hours ordinarily employed.

I claim:

1. The combination of a brake-lining having flanges formed integral thereon, and a frame having notches formed therein for engaging the flanges for detachably holding the lining in its proper position.

2. The combination of a brake-lining having flanges formed thereon, and a supporting frame provided with side members spaced apart to receive the lining, said side members having notches therein for receiving the flanges formed on the lining to hold the lining in its proper position.

3. The combination of a brake-lining having flanges formed thereon, and a supporting frame provided with side members spaced apart to receive the lining, said side members having notches therein for receiving the flanges formed on the lining to hold the lining in its proper position, and caps pivotally connected with the frame for preventing removal of the flanges from the notches.

4. The combination of a brake-lining having flanges formed thereon, a frame having grooves formed therein for slidably engaging the flanges at the ends of the brake-lining, and having notches formed at other points therein for engaging additional flanges on the lining, and means for holding the flanges in position in the notches.

5. The combination of a brake-lining, a frame including side members held in spaced-apart relation for receiving the lining therebetween, and having notches formed therein, holding means connected with the brake lining and fitted into the notches to hold the lining in proper position, and means for holding the side members together in spaced-apart relation.

6. The combination of a brake lining, a frame including side members held in spaced-apart relation for receiving the lining therebetween, and having applying lugs and plates connected with the associate ends thereof, said side members having notches formed therein, holding means connected with the brake lining and fitted into the notches to hold the lining in proper position, caps pivotally connected with the plates and lugs for overlying the lining and holding it against removal, and means connected with the free ends of the caps for holding them in their proper position.

In testimony whereof I affix my signature.

DANIEL T. HOLMES.